(12) United States Patent
Meijer et al.

(10) Patent No.: US 6,937,704 B1
(45) Date of Patent: Aug. 30, 2005

(54) CONNECTION CONTROLLER FOR SETTING-UP A MEDIA PATH BETWEEN A TERMINAL AND AN AUDIO SOURCE

(75) Inventors: Frank F. Meijer, Ottawa (CA); Daniel D. Thibault, Carleton Place (CA); Stephen J. McIntyre, Stittsville (CA)

(73) Assignee: Nortel Networks Limited, Saint-Laurent (CA)

( * ) Notice: Subject to any disclaimer, the term of this patent is extended or adjusted under 35 U.S.C. 154(b) by 1025 days.

(21) Appl. No.: 09/722,105

(22) Filed: Nov. 27, 2000

(51) Int. Cl.[7] .............................................. H04M 1/64
(52) U.S. Cl. ............................... 379/88.18; 379/88.16; 379/88.25; 379/101.01
(58) Field of Search .......................... 379/67.1, 68, 69, 379/70, 74, 76, 88, 88.16, 88.18, 88.22–88.25, 101.01, 202.01, 203.01, 204.01, 205.01, 206.01, 211.01, 214.01, 215.01, 162, 393, 266.01; 370/351–357; 709/200, 230, 231

(56) References Cited

U.S. PATENT DOCUMENTS

| | | | | |
|---|---|---|---|---|
| 5,557,658 A | * | 9/1996 | Gregorek et al. | 379/88.25 |
| 5,652,784 A | * | 7/1997 | Blen et al. | 379/67.1 |
| 5,703,935 A | * | 12/1997 | Raissyan et al. | 379/88.18 |
| 5,884,262 A | * | 3/1999 | Wise et al. | 704/270 |
| 5,946,378 A | * | 8/1999 | Farfan | 379/88.23 |
| 6,009,150 A | * | 12/1999 | Kamel | 379/88.22 |
| 6,208,729 B1 | * | 3/2001 | Agraharam et al. | 379/215.01 |
| 6,400,804 B1 | * | 6/2002 | Bilder | 379/76 |
| 6,591,115 B1 | * | 7/2003 | Chow et al. | 455/555 |

* cited by examiner

Primary Examiner—Ronald G. Foster

(57) ABSTRACT

A connection controller suitable for use in a PBX. The connection controller can set up a media path to allow a user at a known terminal to receive audio information from an audio source. The connection controller has a directory of audio sources and a processing unit for searching the directory to select an audio source suitable to provide the audio information desired by the user. When the selection is made the processing unit generates and directs control signals to one or more components operative to establish the media path between the selected audio source and the known terminal.

12 Claims, 4 Drawing Sheets

CONNECTION CONTROLLER FOR SETTING-UP A MEDIA PATH BETWEEN A TERMINAL AND AN AUDIO SOURCE

FIELD OF THE INVENTION

The invention relates to communication devices, in particular to a connection controller for the management of a media path between a terminal and an audio source. The connection controller can find applications in PBX systems to procure audio information, such as tones, music-on-hold, recorded announcements, among many others to a terminal of the PBX system.

BACKGROUND OF THE INVENTION

In a Private Branch Exchange (PBX) system, there is usually the need to provide audio information, such as tones, music-on-hold, etc. Traditionally, a PBX system has a single audio server that provides the audio information. This is undesirable because the choice of the audio information available to the user is limited. As well, when terminals can be connected through a variety of connection types, the source of the audio information may not be optimally formatted for all devices and therefore requires the inclusion of additional elements to format the data for non-optimal terminals.

SUMMARY OF THE INVENTION

In a broad aspect, the invention provides a connection controller for setting up a media path to allow users at one or more terminals to receive audio information from an audio source. The connection controller has a directory of audio sources and a processing unit to select from the directory which audio source to use. When an audio source is requested by a user at a known terminal, the processing unit receives signaling information indicative of the type of audio information desired by the user residing at the known terminal. The processing unit then searches the directory of audio sources to select an audio source suitable to provide the audio information desired by the user. Once an audio source is selected, the processing unit generates control signals to cause establishment of a media path between the selected audio source and the known terminal.

The connection controller offers the possibility of selecting the audio source from which the audio information will be obtained. This approach is advantageous by comparison to prior art devices that do not offer such selection and are limited to a single audio source.

For the purpose of this specification, the expression "audio source" refers to any agency that can generate a signal containing audio information. The audio information can be a tone, music, recorded announcement or any other sound. The audio information can be obtained from a recording, a live broadcast or by synthetically generated. However, "audio source" is to be distinguished from a terminal, such as a telephone terminal from which a user communicates with a remote party by exchanging voice and/or video signals. In addition, it should be expressly noted that "audio source" is not limited solely to an agency that produces solely audio information. Possibilities where the "audio source" generates data or video signals, in addition to the signal containing audio information are well within the present inventive concept.

Under a non-limiting example of implementation, the device is part of a PBX system that spans two different network domains, namely the circuit-switched network domain and the packet-switched network domain. Such a PBX system has a call manager and a connection controller. Under this example, the connection controller has a dual function, namely setting up a media path between two terminals during a call session and delivering audio information to a terminal when required. The connection controller has a directory of audio sources and a processing unit. When a request for audio information is made, the processing unit searches the directory and selects an audio source to use. If two or more audio sources that can supply the desire audio information exist, for example, at least one in each network domain, the processing unit will select the audio source that resides in the same domain as the terminal requesting the audio information.

In a second broad aspect, the invention provides a method for facilitating the delivery of audio information from an audio source to a user residing at a known terminal. The method comprises searching a directory of audio sources to select an audio source suitable to provide the audio information desired by the user, and directing control signals to one or more components operative to establish the media path between the selected audio source and the known terminal.

BRIEF DESCRIPTION OF THE DRAWINGS

A detailed description of examples of implementation of the present invention is provided hereinbelow with reference to the following drawings, in which.

Figure 1:
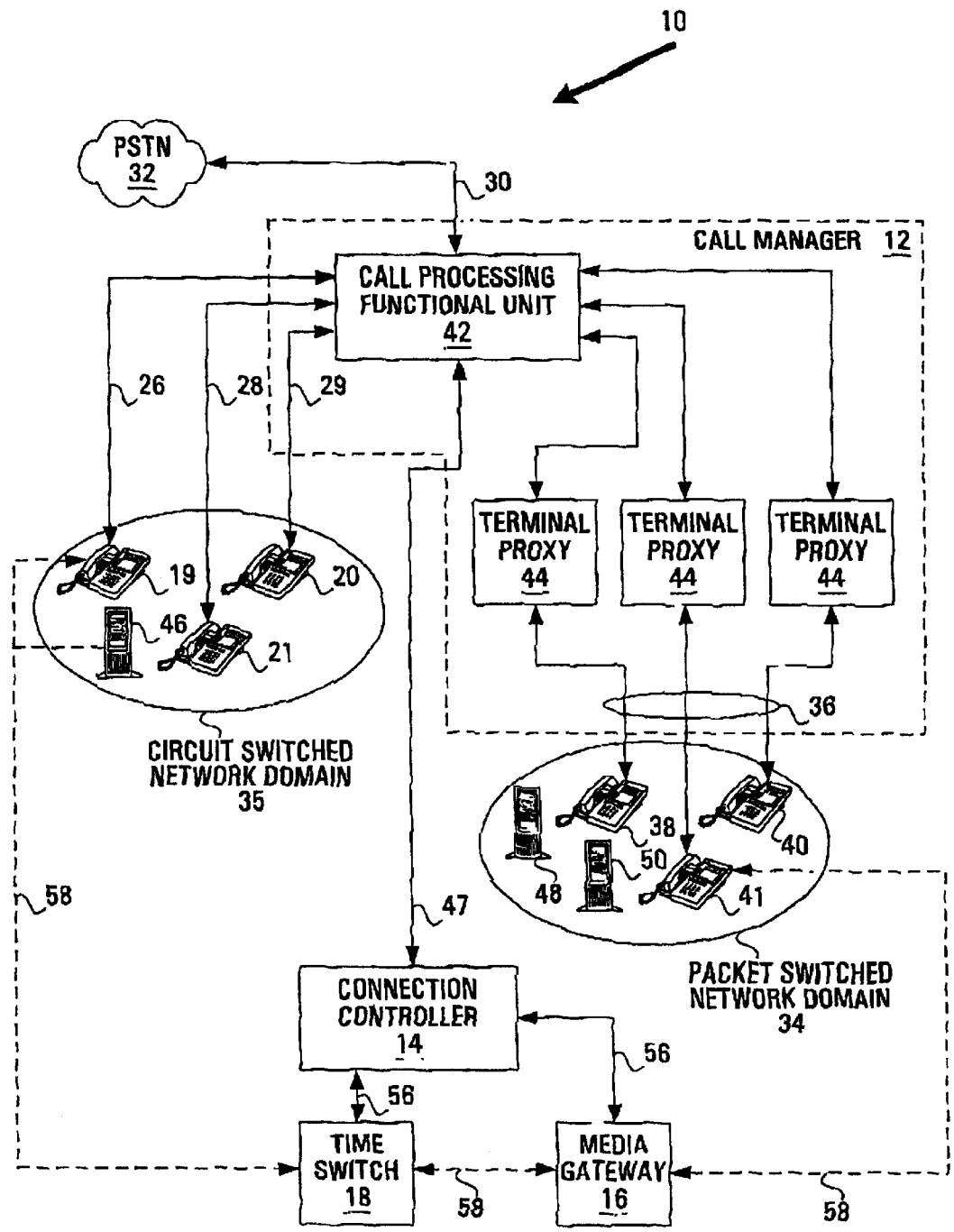
FIG. 1 is a block diagram of a private branch exchange (PBX) that spans two different network domains and also shows an inter-domain media path established between and audio source and a terminal.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

An example of implementation of the present invention is illustrated in FIG. 1 that depicts a PBX system 10 containing terminals residing in the circuit-switched domain and terminals residing in the packet-switched domain. More particularly, the PBX system 10 has four main functional units, namely a call manager 12, a connection controller 14, an array of media gateways 16 (only one media gateway is shown in the drawings for simplicity) and a time switch 18 (only the time switch is shown in the drawings for simplicity).

The PBX system 10 spans network domains that differ from one another by the way in which a connection between the terminals involved during a call session is made. The first domain is a circuit-switched domain 35, while the second domain is a packet-switched domain 34. The PBX system 10 has a plurality of terminal ports 26, 28, 29 for connection to a corresponding number of terminals that reside in the circuit-switched domain 35 (only three such terminals 19, 20 and 21 are shown in the drawings). An external trunk port 30 allows connecting the PBX system 10 to an external network such as the public switched telephone network (PSTN) 32. Finally, a signaling channel 36 connects the PBX system 10 to terminals in the packet-switched domain 34. A plurality of terminals 38, 40 and 41 reside in the packet-switched domain 34 and allow users to establish call sessions through the PBX system 10 to terminate either in the same domain (packet-switched network 34), at any one of the terminals 19, 20 and 21 or in the PSTN 32.

The circuit-switched domain 35 and the packet-switched domain 34 include a plurality of audio sources 46, 48 and 50 that can deliver a selection of audio information. The audio sources 46, 48 and 50 may be part of the PBX 10 or may be remote from the PBX 10. It should be noted that a terminal 19, 20, 21, 38, 40 and 41 can also considered as audio sources if it has the capability to generate audio information (other than the speech input by the user when talking to a remote party). An example of a case when a terminal 19, 20, 21, 38, 40 and 41 constitutes an audio source when it has a local tone generator whose output can be directed to the terminal itself (the use at the terminal hears the local tone generator) or toward one or more remote terminals 19, 20, 21, 38, 40 and 41.

The Time Switch 18 is an entity that routes media signal properly to complete the media signals paths in the Circuit Switched Domain during a call session or during the delivery of audio information to a terminal. For example, during the local call involving terminals 19 and 20, the Time switch 18 will establish a full duplex media signals path between terminals such that each user can hear what the other part is saying.

As mentioned earlier, the PBX system 10 has an array of Time switches 18 providing sufficient resources to handle a plurality of call sessions simultaneously.

The media gateway 16 forms a point of intersection between the circuit-switched domain 35 and the packet-switched domain 34 spanned by the PBX 10. The media gateway 16 is responsible for performing the necessary media signals conversions such that parties involved in a call session terminating in different domains can hear what each other is saying. One example of media signals in the circuit-switched domain 35 are in the form of Pulse Coded Modulation (PCM) signals. When such PCM signals are delivered to the media gateways 16, they are converted into discrete data packets that are sent to the packet-switched network 34 for delivery to the party that terminates the call session in the packet-switched network 34. Advantageously, the media gateway 16 will encode the audio information to compress it in order to reduce the bandwidth requirements. Any suitable encoding algorithm can be used for this purpose. For media signals into the reverse direction, the media gateway 16 converts data packets into a PCM stream that is passed to the circuit-switched domain. If the media signals into the reverse direction are encoded, the media gateway 16 will decode them into a format suitable for circuit switched such as the PCM format.

The call manage 12 includes a call processing functional unit 42 and a plurality of terminal proxies 44. The call manager 12 is a functional entity that is software implemented, as will be discussed later in this specification. Each terminal proxy 44 is an individual program element that is executed by a computing platform to perform the necessary actions or operations.

The terminal proxies 44 are individual software entities managing the operations of the terminals 38, 40 and 41. The notion of terminal proxies to manage the operations of terminals is not new and accordingly there is no necessity to describe in detail the operation of the terminal proxy 44. Suffice it to say that, during the establishment of a call session, the terminal proxy 44 of the terminals 38–41 involved in the call session is responsible for collecting signaling information from the terminals 38–41 and transmitting this information to the call processing functional unit 42. For example, a terminal proxy 44 senses when a user at terminals 38–41 is attempting to make a call (by observing an off-hook condition, for example). The terminal proxy 44 collects the dialed digits and when the number of digits is sufficient, passes them to the call processing functional unit 42.

A terminal proxy 44 also maintains an audio information profile in which is specified the type of audio information that the use desires to her or to make available to another party involved in a call session. For example the audio information profile specifies the type of ring tone that the user prefers, the type of control tones (line open, line busy, line ringing, etc.), the type of music-on-hold, etc.

Any suitable mechanism can be provided to allow the user to change its personal audio information profile. One possibility to make the changes is through the terminals 38–41.

Although FIG. 1 shows that only the terminals 38–41 in the packet-switched network domain 34 are provided with terminal proxies 44, it should be understood that the audio information profile is also available for all the terminals 19–21 in the circuit-switched network domain 35. In that case, the audio information profile for each terminal resides or is associated with the call processing functional unit 42. Accordingly, a user at any terminal supported by the PBX system 10 can specify the type of audio information that he or she desires to hear.

The call processing functional unit 42 is primarily responsible for setting up a call session. For internal calls, the call processing functional unit 42 issues the necessary control signals to the connection controller 14 to set up the media signals paths such that call sessions can be established.

Figure 4:
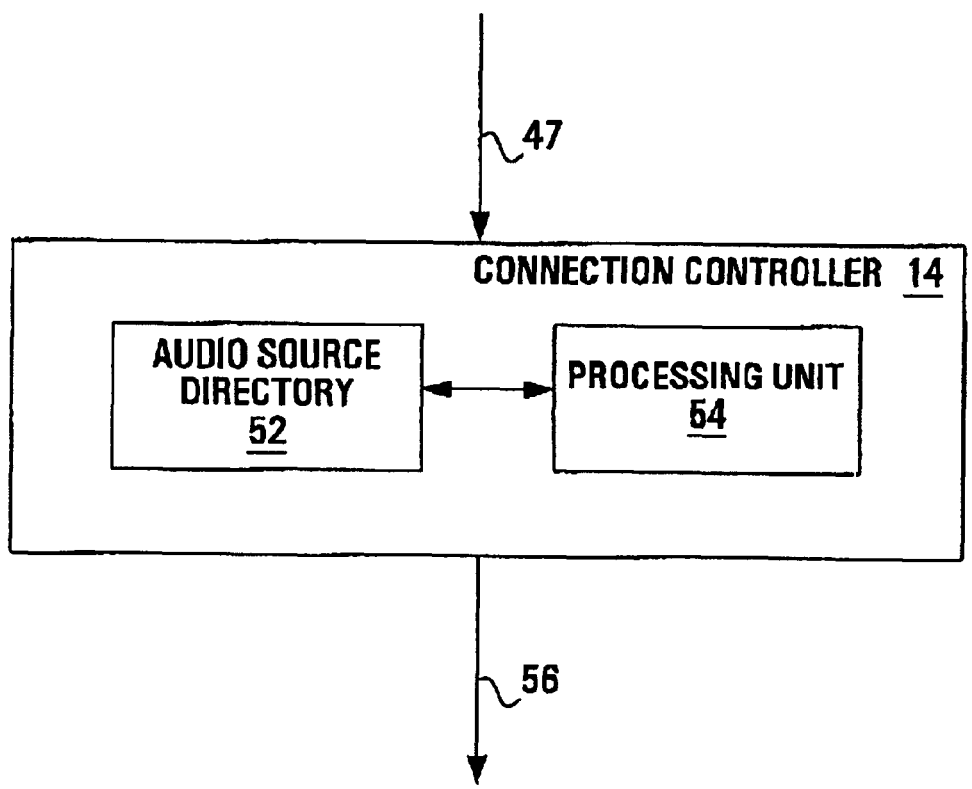
FIG. 4 is a more detailed block diagram the connection controller shown in FIG. 1.

FIG. 4 illustrates in greater detail the structure of the connection controller 14. The connection controller has input 47 through which signaling information sent from the call manager 12 or from other sources, such as the terminal proxies 44, is received. The connection controller includes an audio source directory 52 and a processing unit 54. The audio source directory contains an information about the capabilities of the various audio sources 46, 48 and 50 from which audio information can be delivered to a terminal 19, 20, 21, 38, 40 and 41. In a very specific example, the audio source directory maps the network address of each audio source 46, 40 and 50 to its capabilities, such as the type of audio information the audio source 46, 48 and 50 can provide. The connection controller also includes a processing unit 54 that implements logic to select the audio source to use when a terminal makes the request for audio information. Another function of the processing unit 54 is to set-up media paths between terminals of the PBX 10 involved in a call session. This function will not be described because it is beyond the scope of this specification and also it is known to those skilled in the art.

It should be noted that it is well within the scope of this invention to provide a connection controller that is solely responsible for managing the delivery of audio information to a terminal, while providing a separate agency to handle media path establishment during call sessions.

The following examples will help to illustrate the functionality of the connection controller 14.

1) EXAMPLE #1 (THE SCENARIO IS ILLUSTRATED IN FIG. 1)

a) At some point during a call session involving terminals 19 and 41, the user at terminals 19 puts the user at terminal 41 on hold. When the call processing functional unit 42 detects the "on hold" status, it consults the audio information profile associated with the terminal 19 and determines that during on "on hold" status classical music is to be played on the line.

b) The call processing functional unit 42 issues signaling information to the connection controller 14. The signaling information is delivered through the input 47 and specifies the address of the terminal at which the music is to be played (terminal 41, terminal 19 or both) and the type of music to be played (classical music).

c) The processing unit 54 searches the audio source directory 52 to locate the audio source(s) that can provide the desired music type.

d) The processing unit 54 locates a single audio source that can provide the desired music type. The audio source is the audio source 46 located in the circuit-switched network domain.

e) The processing unit 54 generates control signals that are released from the output 56. The control signals are directed to network elements such that the audio signal released from the audio source 46 will be delivered to the desired destination. In the example shown at FIG. 1, where a media path 58 already exists between the terminals 19 and 41, the control signals will direct the audio source 46 and the time switch 18 to cooperate such that the output of the audio signal 46 can be introduced in the media path 58. There is no necessity to describe how this cooperation is performed since it would be known to a person skilled in the art. At this point music is available to both parties involved in the call session.

f) If the media path 58 was not set, then the control signals issued from the output 16 will have the effect of establishing a media path such that the audio information can be delivered to the intended destination. Such control signals can, for example, include signals directed to the time switch 18 and to the media gateway 16 such as to set up the inter-domain media path.

Figure 2:
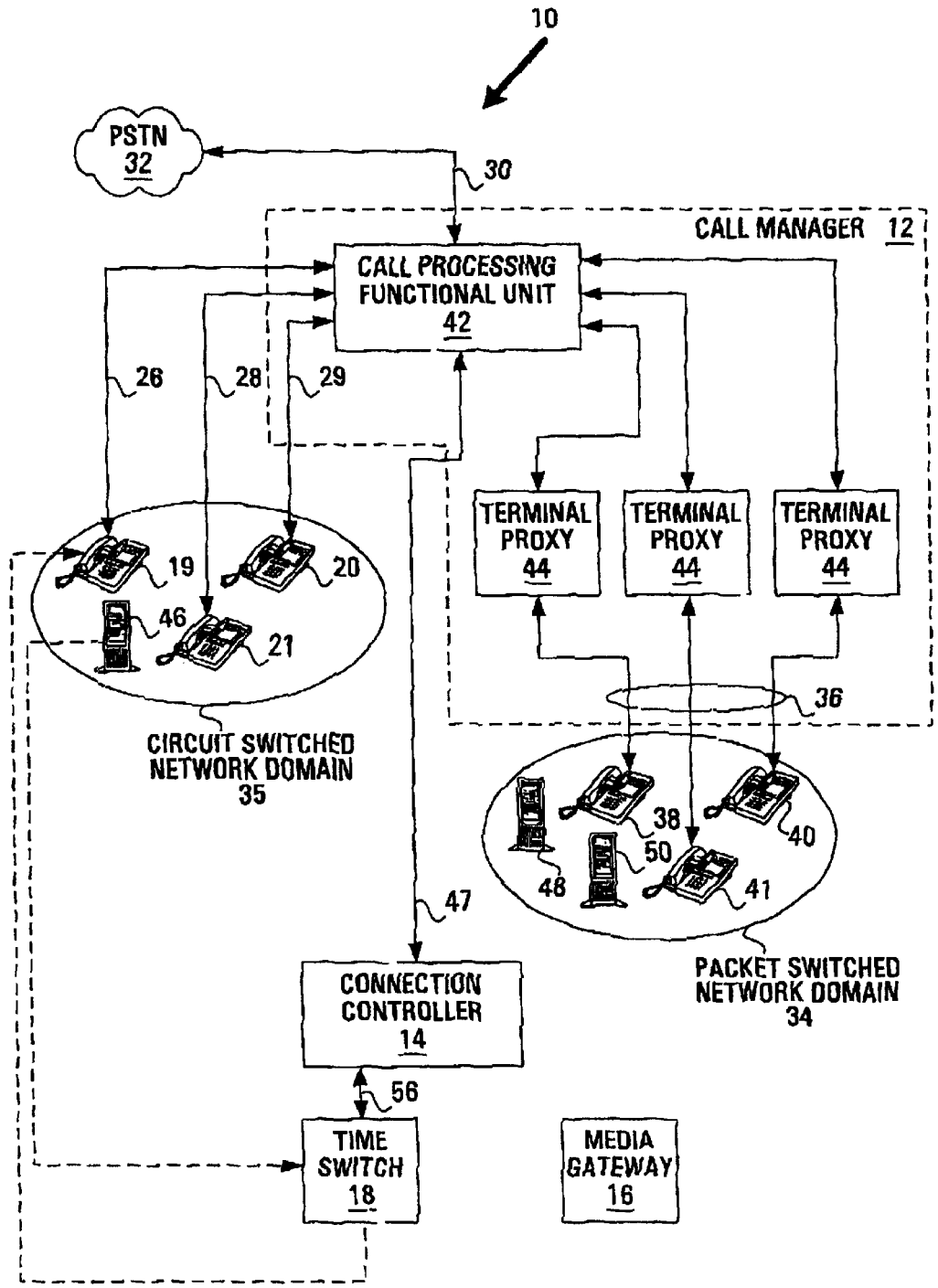
FIG. 2 is similar to FIG. 1 with the exception that the media path is established between an audio source in the circuit-switched domain and a terminal also residing in the circuit-switched domain.
Figure 3:
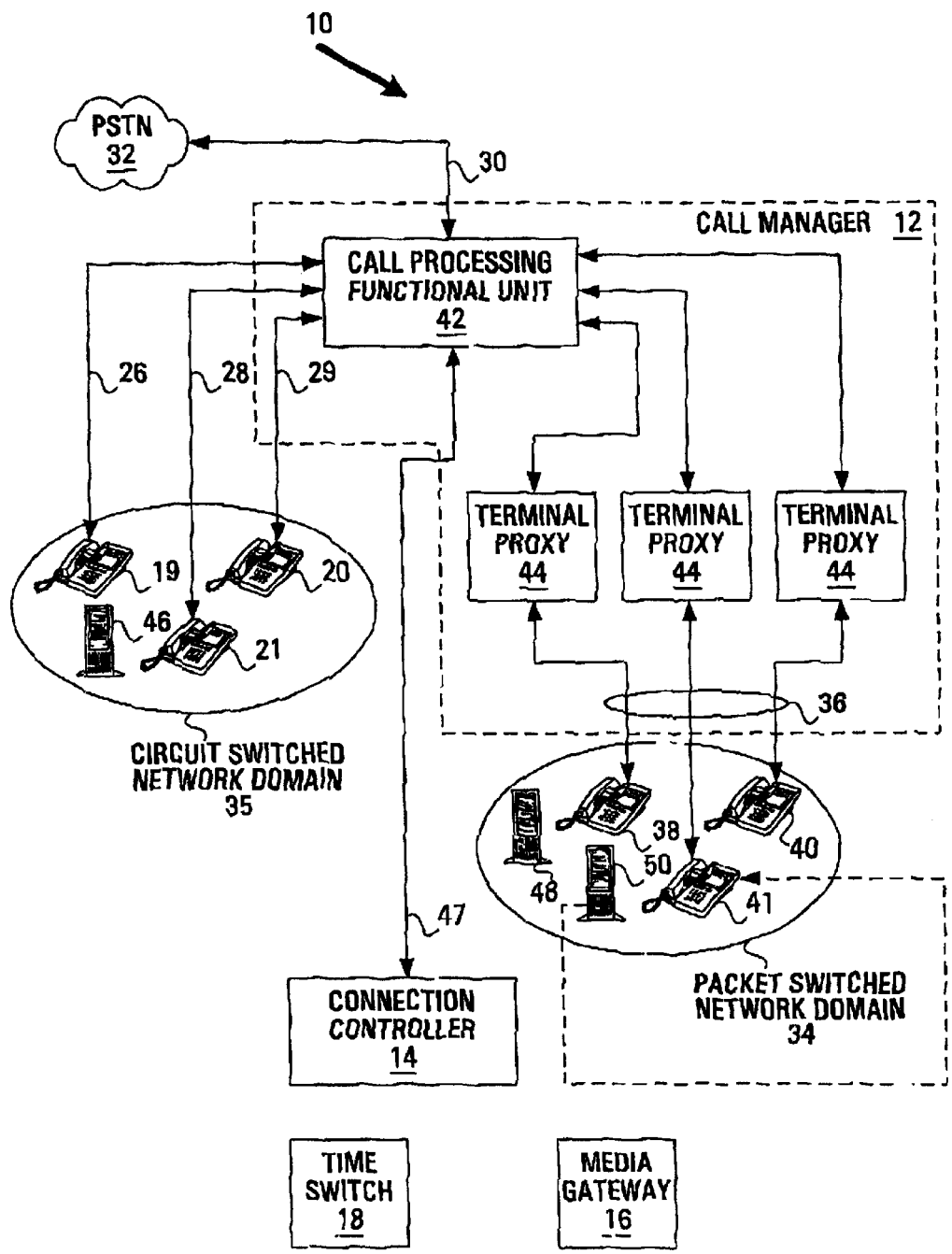
FIG. 3 is similar to FIG. 1 with the exception that the media path is established between an audio source in the packet-switched domain and a terminal also residing in the packet-switched domain.

2) EXAMPLE #2 (THE SCENARIO IS ILLUSTRATED IN FIG. 2)

a) While the terminal 19 is not involved in a call session, the user invokes "live broadcast" function. When the call processing functional unit 42 detects the "live broadcast" request, it consults the audio information profile associated with the terminal 19 and determines that during a "live broadcast" radio station CAFS (fictitious name) is to be played on the line.

b) The call processing functional unit 42 issues signaling information to the connection controller 14. The signaling information is delivered through the input 47 and specifies the address of the terminal at which the live broadcast is to be delivered (terminal 19) and the identifier of the radio station (CAFS).

c) The processing unit 54 searches the audio source directory 52 to locate the audio source(s) that can provide the desired live broadcast.

d) The processing unit 54 locates two audio sources that can provide the desired live broadcast. The audio sources are the audio source 46 located in the circuit-switched network domain 35 and the audio source 48 in the packet-switched network domain 34.

e) The processing unit 54 selects the audio source 46 to avoid establishing inter-domain connections.

f) The processing unit 54 generates control signals that are released from the output 56. The control signals are directed to network elements such that the audio signal released from the audio source 46 will be delivered to the terminal 19. In the example shown at FIG. 2, the control signals will direct the time switch 18 to establish a media path from the audio source 46 to the terminal 19.

3) EXAMPLE #3 (THE SCENARIO IS ILLUSTRATED IN FIG. 3)

a) This example is very similar to example 2 except that the selected audio source resides in the packet-switched domain 34 instead of the circuit-switched domain 35.

The connection controller 14 is implemented by software. More particularly, the software is a program element contained on a computer readable storage medium. The program element is executable on a suitable computing platform to provide the functionality of the connection controller. Alternatively, the connection controller can be implemented in hardware or a combination software/hardware, without departing from the spirit of the invention.

Although various embodiments have been illustrated, this way for the purpose of describing, but not limiting, the invention. Various modifications will become apparent to those skilled in the art and are within the scope of this invention, which is defined more particularly by the attached claims.

What is claimed is:

1. A connection controller for setting up a media path to allow a user at one terminal to receive audio information from an audio source, said connection controller comprising:

a) an input for receiving signaling information indicative of a type of audio information desired by a user residing at a known terminal wherein the known terminal resides in either one of a packet-switched network domain and a circuit-switched network domain;

b) a directory of audio sources;

c) a processing unit responsive to the signaling information to:

i) search the directory of audio sources to select an audio source suitable to provide the audio information desired by the user, said processing unit utilizing information indicative of the domain in which the known terminal resides in selecting the audio source suitable to provide the audio information desired by the user;

ii) based on the searching generate control signals suitable for use in establishing a media path between the selected audio source and the known terminal;

d) an output to release the control signals.

2. A connection controller for setting up a media path to allow a user at one terminal to receive audio information from an audio source, said connection controller comprising:

a) an input for receiving signaling information, indicative of a type of audio information desired by a user residing at a known terminal, wherein the known terminal resides in either one of a packet-switched network domain and a circuit-switched network domain;

b) a directory of audio sources;

c) a processing unit responsive to the signaling information to:
   i) search the directory of audio sources to select an audio source suitable to provide the audio information desired by the user, said processing unit utilizing information indicative of the domain in which the known terminal resides in selecting the audio source suitable to provide the audio information desired by the user, wherein when the directory of audio sources indicates two or more audio sources suitable to provide the audio information desired by the user and residing in different network domains, said processing unit is operative to select the audio source residing in the same network domain as the known terminal;
   ii) based on the searching generate control signals suitable for use in establishing a media path between the selected audio source and the known terminal;
d) an output to release the control signals.

3. A connection controller as defined in claim 2, wherein the audio information is a tone.

4. A connection controller as defined in claim 2, wherein the audio information is a music-on-hold.

5. A connection controller as defined in claim 2, wherein the audio information is a recorded announcement.

6. A connection controller as defined in claim 2, wherein the audio information is a live broadcast.

7. A computer readable storage medium including a program element for execution by a computing device to implement a connection controller for setting up a media path to allow a user at one terminal to receive audio information from an audio source, said connection controller comprising:
   a) an input for receiving signaling information, indicative of a type of audio information desired by a user residing at a known terminal, wherein the known terminal resides in either one of a packet-switched network domain and a circuit-switched network domain;
   b) a directory of audio sources;
   c) a processing unit responsive to the signaling information to:
      i) search the directory of audio sources to select an audio source suitable to provide the audio information desired by the user, said processing unit utilizing information indicative of the domain in which the known terminal resides in selecting the audio source suitable to provide this audio information desired by the user;
      ii) based on the searching generate control signals suitable for use in establishing, a media path between the selected audio source and the known terminal.

8. A computer readable storage medium including a program element for execution by a computing device to implement a connection controller for setting up a media path to allow a user at one terminal to receive audio information from an audio source, said connection controller comprising:
   a) an input for receiving signaling information indicative of a type of audio information desired by a user residing at a known terminal, wherein the known terminal resides in either one of a packet-switched network domain and a circuit-switched network domain;
   b) a directory of audio sources;
   c) a processing unit responsive to the signaling information to:
      i) search the directory of audio sources to select an audio source suitable to provide the audio information desired by the user, said processing unit utilizing information indicative of the domain in which the known terminal resides in selecting the audio source suitable to provide the audio information desired by the user, wherein when the directory of audio sources indicates two or more audio sources suitable to provide the audio information desired by the user and residing in different network domains, said processing unit is operative to select the audio source residing in the same network domain as the known terminal;
      ii) based on the searching, generate control signals suitable for use in establishing a media path between the selected audio source and the known terminal.

9. A PBX comprising a connection controller as described in claim 2.

10. A connection controller for setting up a media path to allow a user at one terminal to receive audio information from an audio source, said connection controller comprising:
   a) input means for receiving signaling information indicative of a type of audio information desired by a user residing at a known terminal, wherein the known terminal resides in either one of a packet-switched network domain and a circuit-switched network domain;
   b) directory means of audio sources means;
   c) processing means responsive to the signaling information to:
      i) search the directory means to select an audio source means suitable to provide the audio information desired by the user, said processing means utilizing information indicative of the domain in which the known terminal resides in selecting the audio source means suitable to provide the audio information desired by the user, wherein when the directory means includes two or more audio sources means suitable to provide the audio information desired by the user and residing in different network domains, said processing means is operative to select the audio source means residing in the same network domain as the known terminal;
      ii) based on the searching generate control signals suitable for use in establishing a media path between the selected audio source means and the known terminal.

11. A method for facilitating the delivery of audio information from an audio source to a user residing at a known terminal, comprising:
   a) receiving signaling information indicative of a type of audio information desired by a user residing at the known terminal, wherein the known terminal resides in either one of a packet-switched network domain and a circuit-switched network domain;
   b) searching a directory of audio sources to selection audio source suitable to provide the audio information desired by the user, wherein said searching comprises utilizing information indicative of the domain in which the known terminal resides in selecting the audio source suitable to provide the audio information desired by the user;
   c) based on the searching generate control signals suitable for use in establishing a media path between the selected audio source and the known terminal; and
   d) releasing the control signals to one or more components operative to establish the media path between the selected audio source and the known terminal.

12. A method for facilitating the delivery of audio information from an audio source to a user residing at a known terminal, comprising:
- a) receiving signaling information indicative of a type of audio information desired by a user residing at the known terminal, wherein the known terminal resides in either one of a packet-switched network domain and a circuit-switched network domain;
- b) searching a directory of audio sources to select an audio source suitable to provide the audio information desired by the user, wherein said searching comprises utilizing information indicative of the domain in which the known terminal resides in selecting the audio source suitable to provide the audio information desired by the user, wherein when the directory of audio sources indicates two or more audio sources suitable to provide the audio information desired by the user and residing in different network domains, selecting the audio source residing in the same network domain as the known terminal;
- c) based on the searching generate control signals suitable for use in establishing a media path between the selected audio source and the known terminal; and
- d) releasing the control signals to one or more components operative to establish the media path between the selected audio source and the known terminal.

* * * * *